(12) United States Patent
Bang et al.

(10) Patent No.: US 9,194,534 B1
(45) Date of Patent: Nov. 24, 2015

(54) SIGNAL LIGHT APPARATUS

(71) Applicant: LINDSAY TRANSPORTATION SOLUTIONS, INC., Omaha, NE (US)

(72) Inventors: Nicholas Kent Bang, Omaha, NE (US); Paul Keck, Callahan, FL (US)

(73) Assignee: Lindsay Transportation Solutions, Inc., Omaha, NE (US)

( * ) Notice: Subject to any disclaimer, the term of this patent is extended or adjusted under 35 U.S.C. 154(b) by 0 days.

(21) Appl. No.: 14/277,996

(22) Filed: May 15, 2014

(51) Int. Cl.
| | |
|---|---|
| *F21S 8/08* | (2006.01) |
| *F16M 11/10* | (2006.01) |
| *G08G 9/00* | (2006.01) |
| *F21V 21/26* | (2006.01) |
| *F21V 21/14* | (2006.01) |

(52) U.S. Cl.
CPC ............. *F16M 11/10* (2013.01); *F21V 21/14* (2013.01); *F21V 21/26* (2013.01); *G08G 9/00* (2013.01)

(58) Field of Classification Search
CPC ......... F21V 21/00; F21V 21/14; F21V 21/26; F21S 4/001; F21W 2131/00; F16M 11/10; F16M 11/18
USPC ............ 248/123.2, 371, 372.1; 362/382, 418, 362/427, 431
See application file for complete search history.

(56) References Cited

U.S. PATENT DOCUMENTS

| | | | |
|---|---|---|---|
| 189,514 A | 4/1877 | Stimpson | |
| 926,426 A | 6/1909 | Koch | |
| 3,355,847 A * | 12/1967 | Pratt | E04H 12/187 362/431 |
| 4,149,347 A | 4/1979 | Boemer | |
| 4,697,672 A | 10/1987 | Linton | |
| 5,170,975 A | 12/1992 | Chadwick | |
| 5,171,088 A * | 12/1992 | Tellier | F16M 11/10 362/233 |
| 2013/0220760 A1 | 8/2013 | Tsao | |

FOREIGN PATENT DOCUMENTS

| | | |
|---|---|---|
| CN | 2531042 Y | 1/2003 |
| FR | 2875582 B1 | 3/2007 |
| FR | 2924731 A1 | 6/2009 |
| GB | WO2009007757 | 1/2009 |
| KR | 101108665 B1 | 1/2012 |

* cited by examiner

Primary Examiner — Todd M Epps
(74) Attorney, Agent, or Firm — Thomas R. Lampe

(57) ABSTRACT

Signal light apparatus includes a tiltable structure including a mast, a counter-weight and a signal light which is rotatably mounted on a base member. A tilt control assembly releasably maintains the tiltable structure at alternative tilt orientations though frictional engagement between structural components of the tilt control assembly.

17 Claims, 5 Drawing Sheets

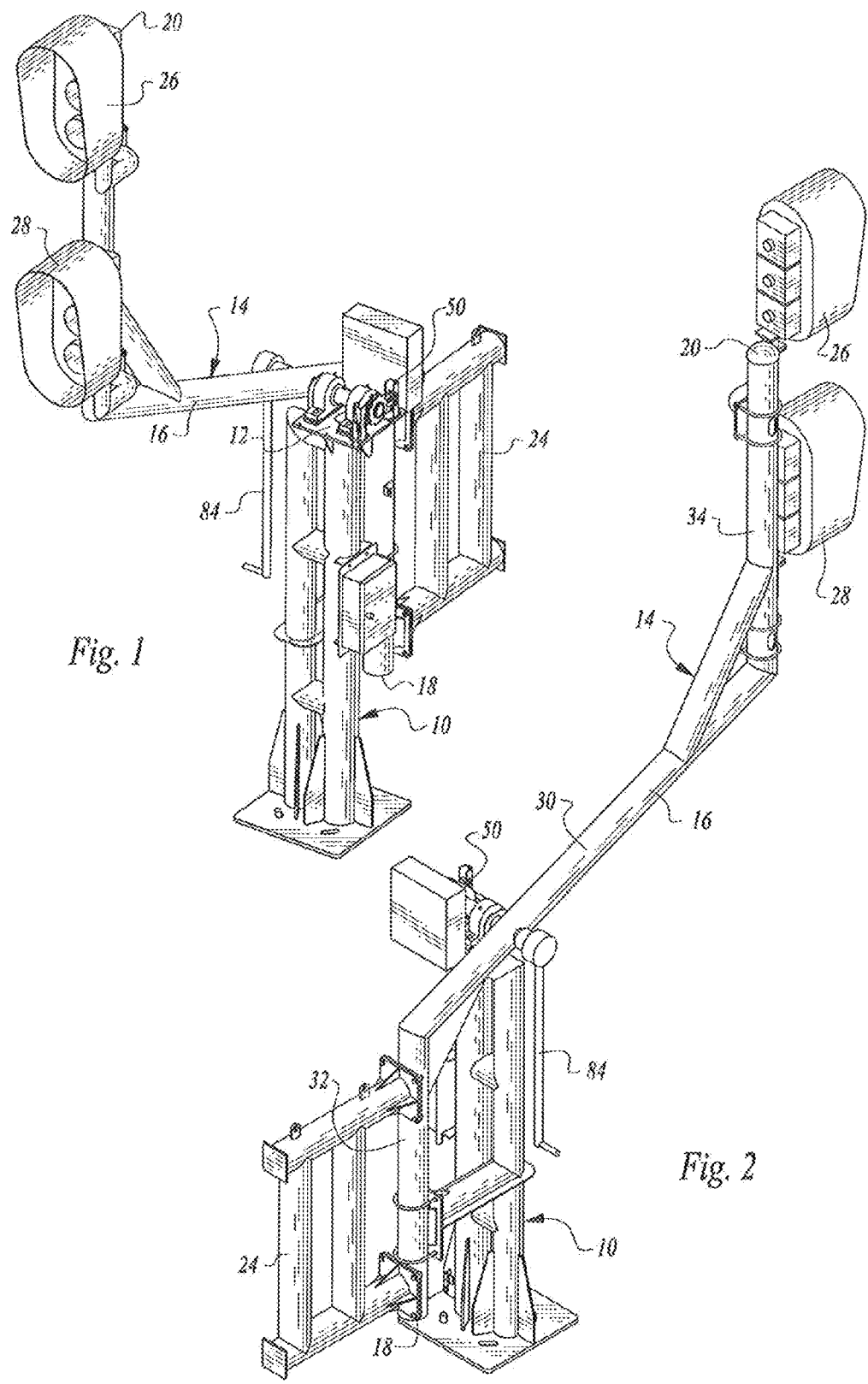

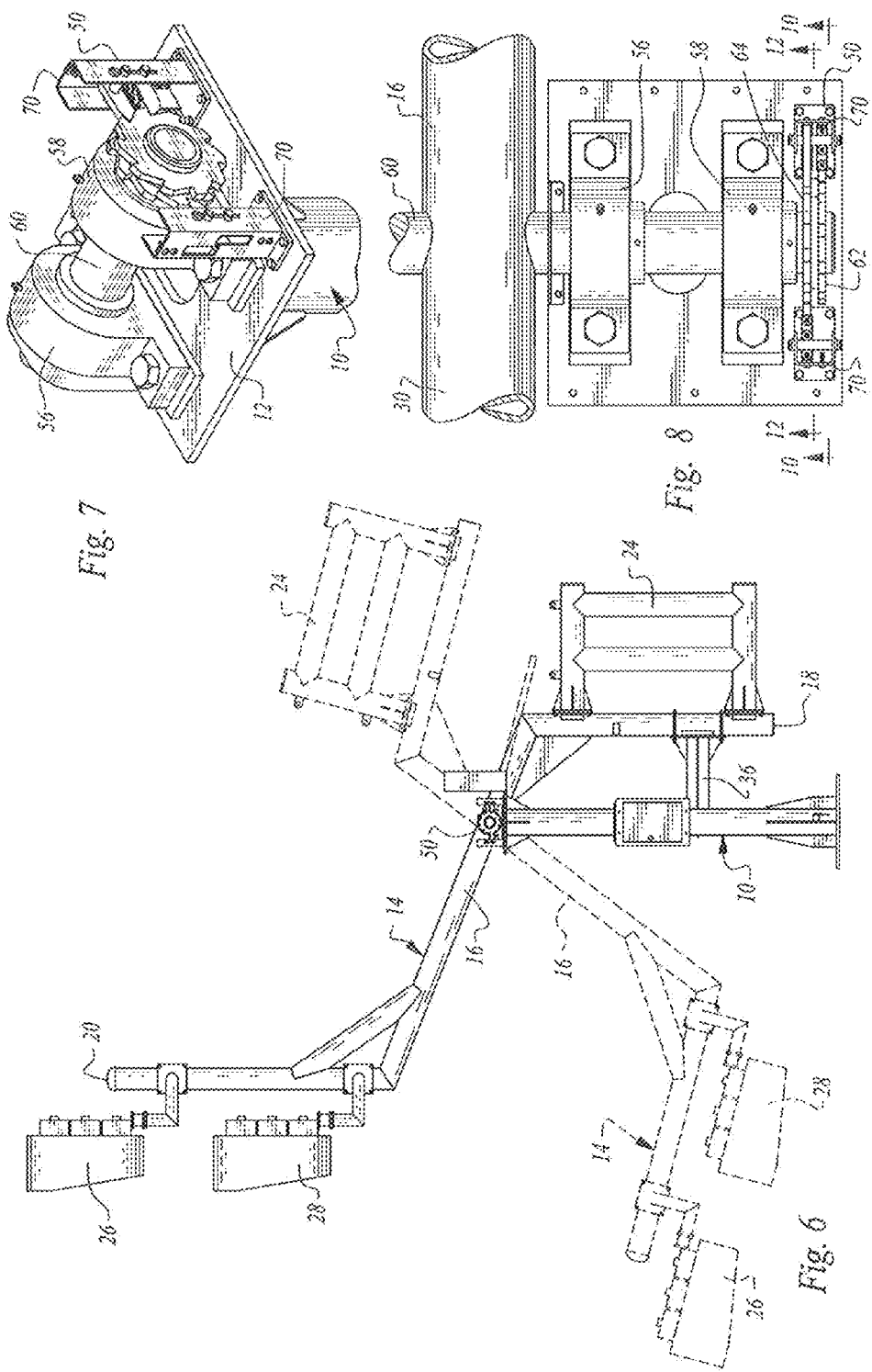

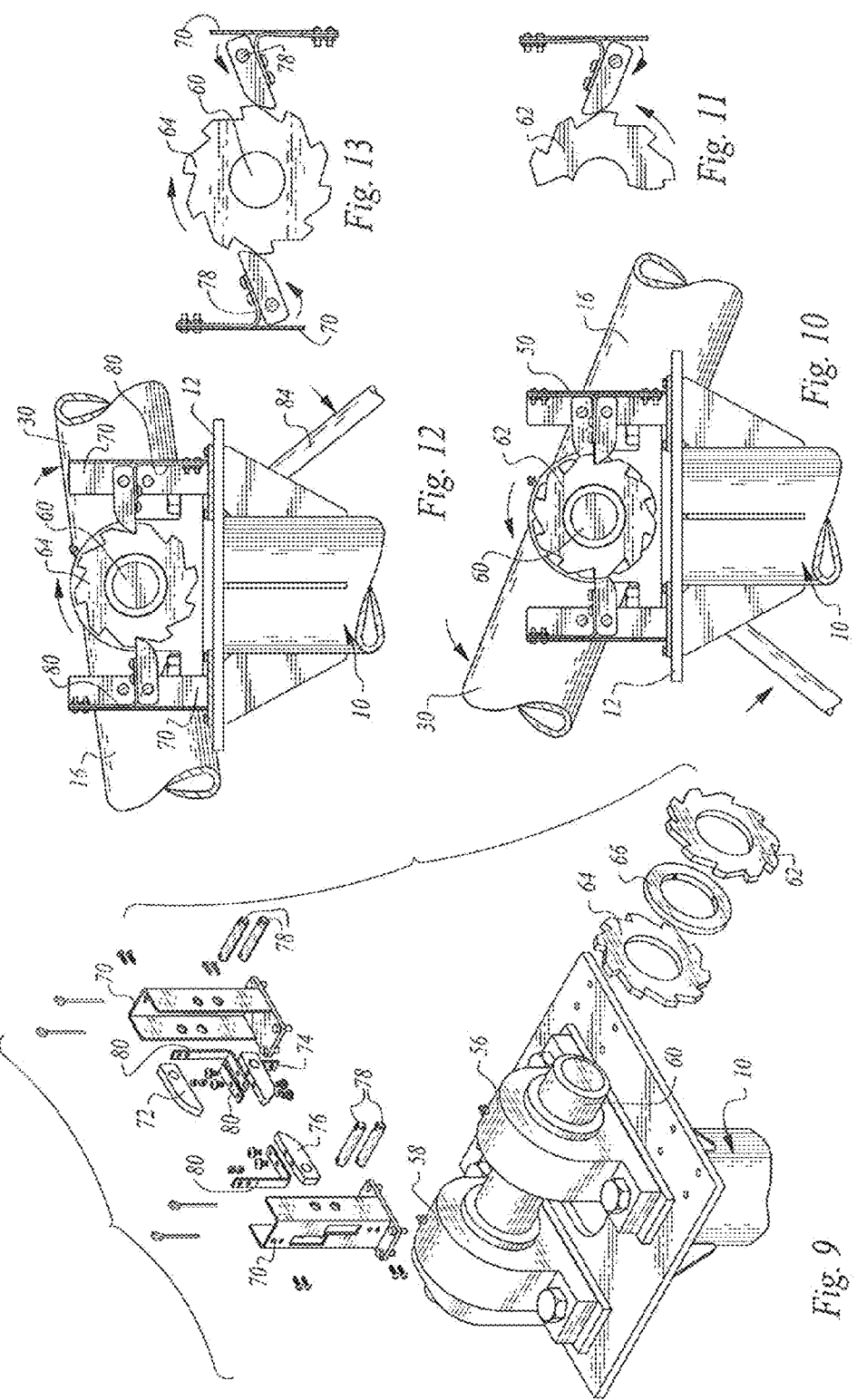

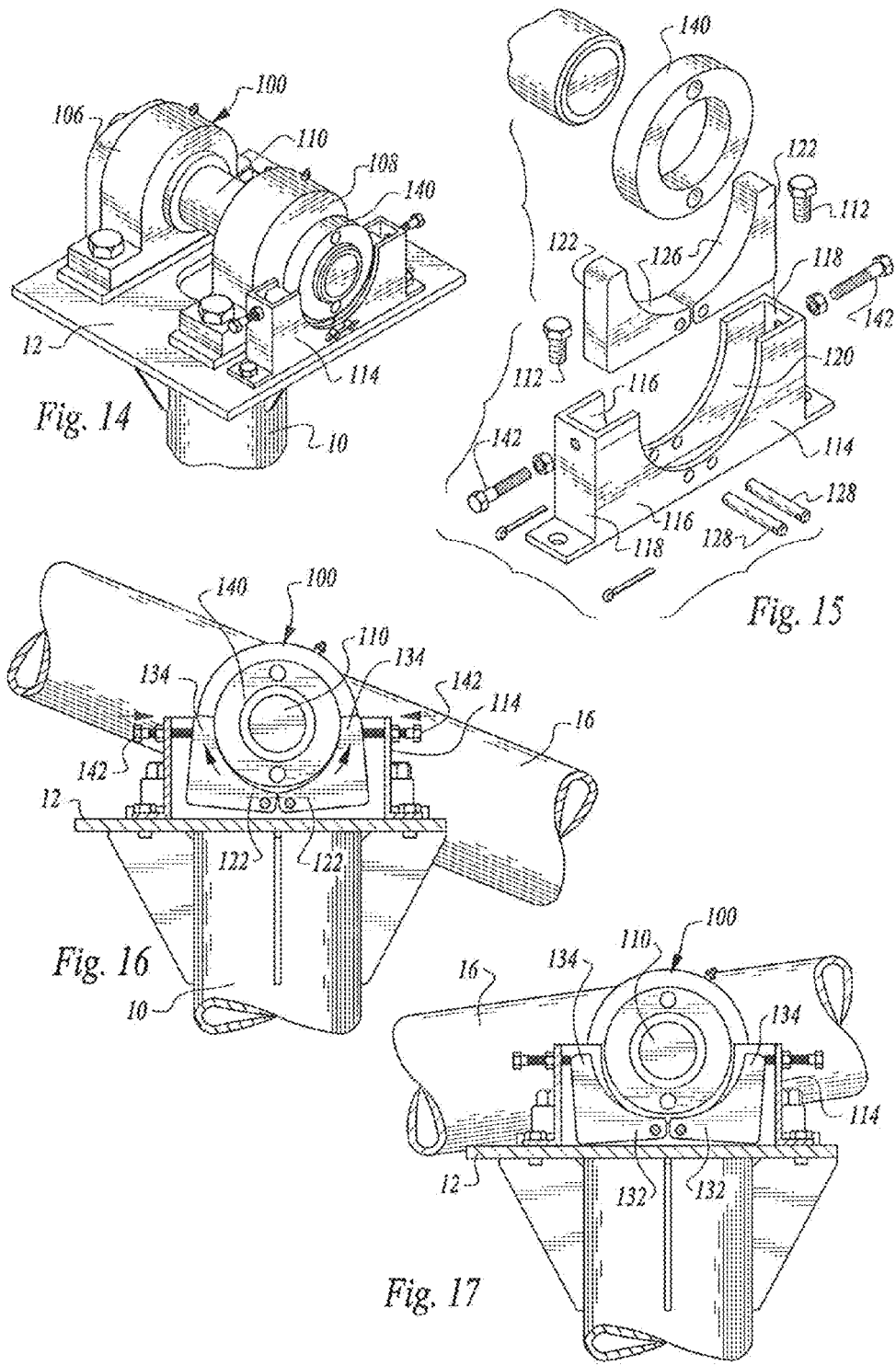

SIGNAL LIGHT APPARATUS

TECHNICAL FIELD

This invention relates to a signal light apparatus, more particularly a signal light apparatus incorporating tiltable structure including a mast having at least one signal light attached at an end portion thereof.

BACKGROUND OF THE INVENTION

Poles and masts of various types incorporating pivotally attached pole components are known. It is also known to use such poles and masts to support lights, the pivot feature utilized to replace, repair or otherwise service the lights supported thereby without the necessity of climbing.

Counter-weights have been employed to facilitate tilting of mast segments or portions; however, maintaining the tilted portion of a light apparatus at a stable and desired location can be difficult. As will be seen below, the subject invention provides a tilt control mechanism which frictionally engages a tiltable structure including a signal light relative to a base member and which releasably maintains the tiltable structure at alternative selected tilt orientations relative to the base member in the absence of outside forces of predetermined magnitude being applied to the tiltable structure. In other words, an individual can attain the desired degree of tilt and maintain the desired degree of tilt until exerting a force on the tiltable structure sufficient to return it to upright position or change the degree of inclination.

This keeps the individual, such as signal maintainer or inspector, on the ground instead of having to climb a ladder and work from a platform.

The following patent documents are believed to be representative of the current state of the prior art in this field: U.S. Pat. No. 3,355,847, issued Dec. 5, 1967, U.S. Pat. No. 4,149,347, issued Apr. 17, 1979, U.S. Pat. No. 189,514, issued Apr. 10, 1877, U.S. Pat. No. 4,697,672, issued Oct. 6, 1987, U.S. Pat. No. 5,171,088, issued Dec. 15, 1992, U.S. Pat. No. 926,426, issued Jun. 29, 1909, U.S. Pat. No. 5,170,975, issued Dec. 15, 1992, U.S. Patent Publication No. US 2013/0220760, published Aug. 29, 2013, Patent Publication WO 2009/007757, published Jan. 15, 2009, French Patent No. FR2875582, issued Mar. 23, 2007, French Patent No. FR2924731, issued Jun. 12, 2009, Korean Patent No. KR101108665, issued Jan. 25, 2012, Chinese Patent No. CN2531042, issued Jan. 15, 2003.

DISCLOSURE OF INVENTION

The signal light apparatus of this invention includes an elongated base member extending upwardly from the ground or other support surface and having a distal end.

A tiltable structure includes a mast having first and second mast ends pivotally connected at or adjacent to the distal end of the base member at a pivot location on the mast between the mast ends.

The tiltable structure also includes counter-weight structure attached to the mast at or adjacent to the first mast end and at least one signal light attached at or adjacent to the second mast end.

A tilt control assembly at the pivot location provides the connection between the mast and the base member allowing tilting of the tiltable structure relative to the base member and releasably maintaining the tiltable structure at alternative selected tilt orientations relative to the base member in the absence of outside forces of predetermined magnitude being applied to the tiltable structure.

Other features, advantages and objects of the present invention will become apparent with reference to the following description and accompanying drawings.

BRIEF DESCRIPTION OF DRAWINGS

FIG. 1 is a frontal, perspective view of a first embodiment of signal light apparatus of this invention in operative condition with signal lights thereof fully elevated and the tiltable structure in a substantially vertical orientation;

FIG. 2 is a rear, perspective view of the signal light apparatus in the operative condition of FIG. 1;

FIG. 6 is an elevational, side view illustrating the signal light apparatus in operative or use condition by solid lines and in tilted or non-use condition by dash lines;

FIG. 7 is an enlarged, perspective view of the ratchet and pawl assembly of the apparatus;

FIG. 8 is a top, plan view of the ratchet and pawl assembly and a portion of the mast attached thereto;

FIG. 9 is an exploded, perspective view of the ratchet and pawl assembly and related structure;

FIG. 10 is a view taken along line 10-10 of FIG. 8 and showing rotation of a portion of the mast about a pivot location along with a rotating ratchet wheel and associated pawl of the system;

FIG. 11 is an enlarged, somewhat diagrammatic presentation of the relationship between the pawl and ratchet wheel of FIG. 10 during rotation of the ratchet wheel in the direction illustrated in FIG. 10;

FIG. 12 is a view similar to FIG. 10, but illustrating a second ratchet wheel and pawl combination, the second ratchet wheel and mast rotating in the opposite direction, the view being taken along line 12-12 of FIG. 8;

FIG. 13 is a view similar to FIG. 11, but showing the second ratchet wheel and cooperative relationship therebetween with two pawls when the second ratchet wheel is rotated in the direction opposite the direction of FIGS. 10 and 11;

FIG. 14 is a view similar to FIG. 7, but showing a second embodiment of the tilt control assembly;

FIG. 15 is an exploded, perspective view of the tilt control assembly of FIG. 12;

FIG. 16 is a side elevation view showing the second embodiment of tilt control assembly in combination with a mast portion and showing the tilt control assembly in operative condition exerting frictional forces on the mast resisting tilting of the mast; and FIG. 17 is a view similar to FIG. 14 showing the tilt control assembly in inoperative position wherein forces resisting tilting of the mast are not being applied to the mast.

MODES FOR CARRYING OUT THE INVENTION

Figure 3:
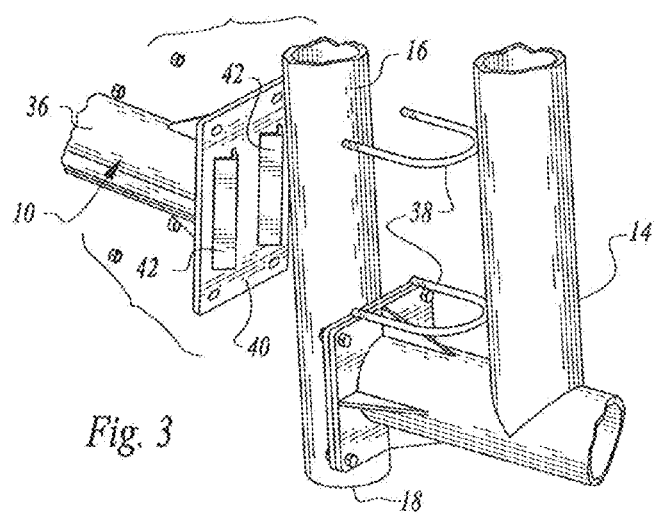
FIG. 3 is an enlarged, exploded, perspective view illustrating selected structural elements including a structural component of the base member and attached structural components of the mast and counter-weight employed in the invention, prior to securing the base member and the mast by lock members.

Referring now to FIGS. 1-13 of the drawings, a first embodiment of signal light apparatus constructed in accordance with the teachings of the present invention is illustrated. The apparatus includes an elongated base member 10 extending upwardly from the ground and secured thereto. The base member has a distal end in the form of a flat plate 12.

The apparatus incorporates a tiltable structure 14 including a mast 16 having mast ends 18, 20. The mast is pivotally connected to the distal end 12 of the base member at a pivot location on the mast between the mast ends. In particular, the pivot location corresponds to the center of gravity of the tiltable structure 14.

The tiltable structure 14 also includes a counter-weight structure 24 attached to the mast adjacent to mast end 18. Signal lights 26, 28 are also part of tiltable structure 14 and they are attached at or adjacent to the mast end 20.

The mast is formed of any suitable material such as stock aluminum. The mast includes a straight central mast portion 30 and spaced end portions 32, 34 laterally projecting from the opposed ends of the central mast portion whereby the mast has a generally Z-shaped configuration. The mast end portions 32, 34 extend along substantially parallel axes and are vertically disposed when the tiltable structure is not tilted relative to the base member.

The counter-weight structure 24 is a metal framework suitably formed of galvanized steel rods projecting away from the base member when the tiltable structure 14 is not tilted; that is, when in the condition shown in FIGS. 1 and 2, for example.

Figure 4:
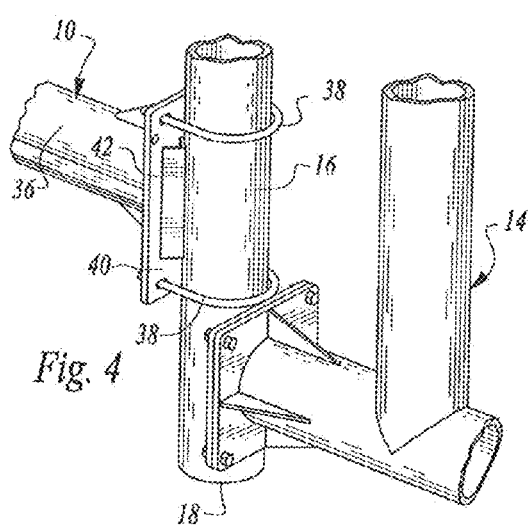
FIG. 4 is a view similar to FIG. 3, but illustrating the structural elements of FIG. 3 locked together.
Figure 5:
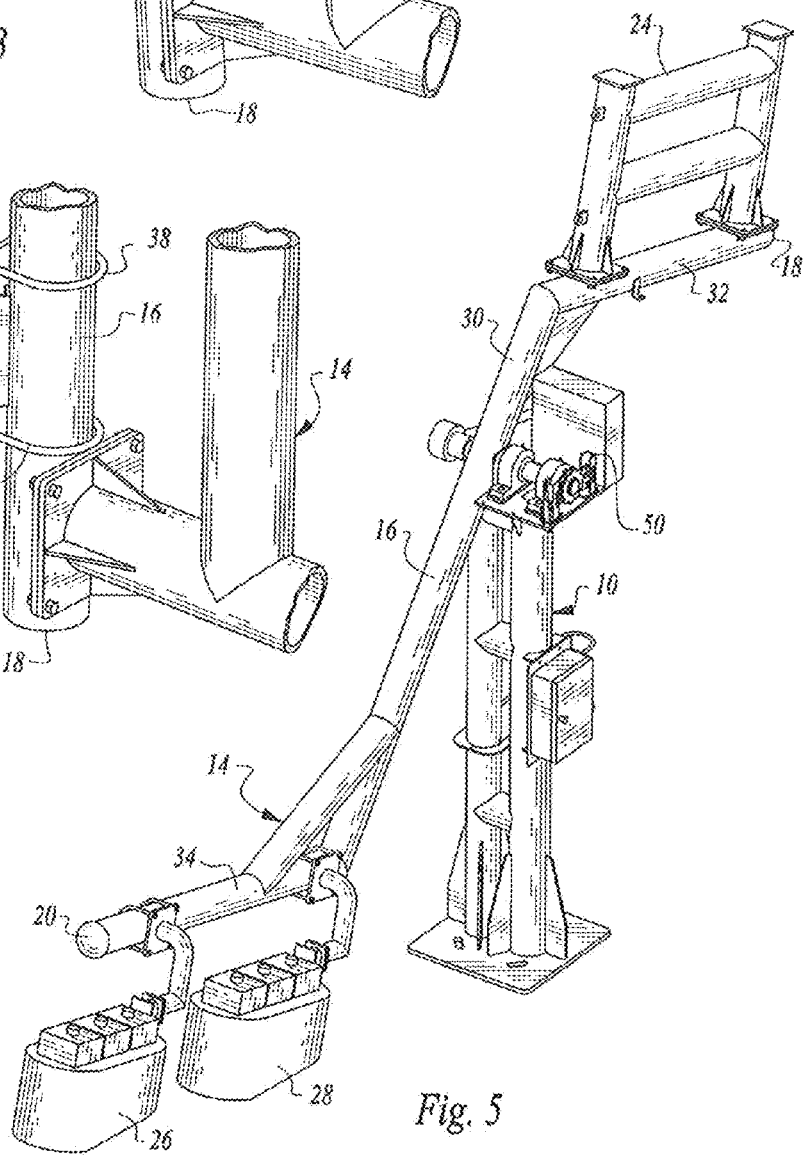
FIG. 5 is a perspective view of the signal light apparatus with tiltable structure including mast, counter-weight structure and signal lights in tilted condition.

Mast end portion 32 having the counter-weight structure attached thereto is closely adjacent and substantially parallel to the base member when the tiltable structure 14 is not tilted. Lock structure is provided to lock mast end portion 32 and the counter-weight structure attached thereto to a laterally extending base member portion 36 to keep the tiltable structure in the operative position shown for example in FIGS. 1 and 2. In the arrangement illustrated, the lock structure includes two U-clamps 38 secured by nuts to a receiver 40 at the end of base member portion 36. Spaced ribs 42 on the receiver maintain the mast end portion 32 and counter-weight structure securely in place. FIG. 3 shows the mast end portion 32 prior to engagement with the receiver 40 and prior to securement by U-clamps 38 and nuts. FIG. 4 shows the structure of FIG. 3 locked securely in place.

The signal light apparatus includes a tilt control assembly comprising a ratchet and pawl assembly 50 at the aforedescribed pivot location and providing the connection between the mast 16 and the base member, allowing tilting of the tiltable structure relative to the base member when clamps 38 have been removed as shown in FIG. 3. The ratchet and pawl assembly 50 allows tilting of the tiltable structure 14 relative to the base member 10 and releasably maintains the tiltable structure at alternative selected tilt orientations relative to the base member in the absence of outside forces of predetermined magnitude being applied to the tiltable structure.

Bearing members 56, 58 are bolted in place on the support plate at the distal end of the base member and rotatably support a shaft 60. Ratchet wheels 62, 64 are welded or otherwise affixed to one end of the shaft 60. A spacer ring 66 maintains a space between the ratchet wheels, however the ratchet wheels and the spacer ring are secured together so that the ratchet wheels both rotate together with the shaft 60, as does spacer ring 66.

The ratchet and pawl assembly also includes pawl supports 70 secured to the support plate, as by means of suitable mechanical fasteners, with the ratchet wheels located between the pawl supports. In the arrangement illustrated, two pawls 72, 74 are operatively associated with one of the pawl supports 70 and a single pawl 76 is operatively associated with the other pawl support 70. The pawls are mounted on support pins 78 and are pivotally mounted thereon. The pawls are also attached to L-shaped springs 80 which are in turn affixed at ends thereof spaced from the pawls to the pawl supports 70. The L-shaped springs continuously bias their respective pawls toward the associated ratchet wheel. In the arrangement illustrated, two pawls are operatively associated with ratchet wheel 64 and one pawl with ratchet wheel 62. The central mast portion 30 is fixedly connected to the shaft 60 at the end thereof remote from the ratchet wheels and pawls. Thus, the mast (along with the rest of the tiltable structure 14) rotates along with the ratchet wheels. In the arrangement illustrated, a handle 84 may be connected to the shaft 62 to rotate the tiltable structure 14 and the ratchet wheels along with the shaft 60.

The ratchet wheels have ratchet teeth with opposed teeth edges, one of the teeth edges being steeply sloped and the other of the teeth edges not being steeply sloped.

The ratchet wheels are oriented in opposition to one another whereby the steeply sloped edge of the teeth of only one of the ratchet wheels is the leading edge when the ratchet wheels are jointly rotated in one direction. The steeply sloped edge of the teeth of the other ratchet wheel is the leading edge when the ratchet wheels rotate in the opposite direction. This operation is shown in FIGS. 10, 11, 12 and 13. The ratchet and pawl assembly acts to resist tilting of the tiltable structure 14 during the lowering and raising operations. Lowering operation utilizes two pawls in case of a failure. The pawls and the ratchet wheels function not as a fixed stop or brake, but essentially as a "slip clutch" which will allow the mast and the rest of the tiltable structure to move completely between the upper (operating) position and lower (service) position as long as an upwardly or downwardly manually exerted force of sufficient magnitude is applied to the tiltable structure.

Upon application of sufficient outside force to rotate the tiltable structure, the pawls will move against spring bias and allow the rotation of the ratchet wheels. However, when such an outside force is removed, frictional engagement between the pawls and the ratchet wheels will be sufficient to maintain the upper pole at any desired immediate position, acting as a safety feature.

FIGS. 14-17 show an alternative embodiment of the invention which includes a tilt control assembly which is not a ratchet and pawl assembly. Otherwise, the tiltable structure with which it is employed is the same as described above and depicted in FIGS. 1-13.

Tilt control assembly 100 is located at the center of gravity of the tiltable structure including mast 16 and provides the connection between the flat support plate 12 of the base member 10 and the mast 16.

Mounted on flat plate 12 are two bearing members 106, 108 bolted in place on the support plate 12. The bearing members rotatably support shaft 110 affixed to mast 16.

Also attached to support plate 12 (by bolts 112) is a rigid mounting bracket 114 of steel or other suitable material. The mounting bracket has opposed side walls 116 and opposed end walls 118. The side walls and end walls define an open-topped cavity 120 receiving two shoes 122 which may be formed of aluminum or other suitable material. The shoes 122 have concavely curved surfaces 126.

The shoes 122 are pivotally mounted on bracket 114 by support pins 128 which extend through apertures in side walls 116 and aligned apertures passing through proximal end portions 132 thereof. Cotter pins are employed to maintain the support pins 128 in position. The curved surfaces 126 extend outwardly and upwardly from the proximal end portions 132 to distal end portions 134 of the shoes.

Attached to shaft 110 and rotatable therewith is a rotor 140 made of aluminum or other suitable material and which as a circular outer peripheral surface. The rotor is located between the distal end portions of the shoes and above the proximal ends of the shoes. When the shoes are in the position shown in FIG. 17 (the non-use position) there is no frictional engagement between the shoes and the rotor 140, the shoes biased by gravity to pivot about said pivot pins to non-use position.

Threadedly mounted on said mounting bracket 114 at the upper portion of the end walls 118 are aligned adjustment bolts 142. Turning of the bolts 142 in one direction moves the bolts inwardly and turning of the bolts in the other direction moves them outwardly. The free ends of the bolts engage the distal portions of the shoes and inward movement of the bolts causes engagement between the rotor and the curved surfaces 126 of the shoes, tilting shoes rotatably about the support pins in opposite directions as shown by the arrows in FIG. 16.

When in motion, the friction between the rotor and the shoes allows the mast and the rest of the tiltable structure to stop in place at any angle when the force is no longer applied to lift or lower the signals. This keeps the signal maintenance/inspector on the ground instead of having to climb a ladder and work from a platform.

The invention claimed is:

1. Signal light apparatus comprising:
   an elongated base member extending upwardly from a support surface and having a distal end;
   a tiltable structure including a mast having first and second mast ends pivotally connected to the base member above the support surface at a pivot location on said mast between said mast ends, counter-weight structure attached to the first mast end of said mast and at least one signal light attached to the second mast end of said mast; and
   a tilt control assembly at said pivot location providing a connection between said mast and said base member allowing tilting of said tiltable structure relative to said base member when an outside force of predetermined magnitude is applied to said tiltable structure and releasably maintaining the tiltable structure at alternative selected tilt orientations relative to said base member when said outside force of predetermined magnitude is not being applied to said tiltable structure.

2. The signal light apparatus according to claim 1 wherein said tilt control assembly comprises a ratchet and pawl assembly including first and second ratchet wheels having ratchet teeth fixedly attached to each other and to the mast for rotation therewith at the pivot location, a first pawl engageable with the ratchet teeth of said first ratchet wheel and not with the ratchet teeth of said second ratchet wheel, and a second pawl engageable with the ratchet teeth of said second ratchet wheel and not in engagement with the teeth of said first ratchet wheel.

3. The signal light apparatus according to claim 1 wherein said tilt control assembly includes a rotor attached to said mast and rotatable with said mast, and at least one adjustable rotor engagement member applying frictional force to said rotor to resist rotation of said rotor and said mast.

4. The signal light apparatus according to claim 3 wherein said tilt control assembly includes two adjustable rotor engagement members, each said rotor engagement member comprising a pivotal shoe with a curved rotor control surface for frictional engagement with said rotor at generally opposed locations on said rotor.

5. The signal light apparatus according to claim 4 wherein said rotor engagement members are pivotally mounted, said tilt control assembly additionally including two adjustment members, one of said adjustment members for adjusting the position of one of said rotor engagement members and the other of said adjustment members for adjusting the position of the other of said rotor engagement members.

6. The signal light apparatus according to claim 2 wherein said ratchet wheels have ratchet teeth with opposed teeth edges, one of said teeth edges being steeply sloped and the other of said teeth edges not being steeply sloped, the ratchet wheels oriented in opposition to one another whereby the steeply sloped edge of the ratchet teeth of said first ratchet wheel is leading edge when the ratchet wheels jointly rotate in one direction and the steeply sloped edge of the ratchet teeth of said second ratchet wheel is leading edge when the ratchet wheels jointly rotate in the opposite direction.

7. The signal light apparatus according to claim 6 wherein said ratchet and pawl assembly includes springs continuously biasing said first and second pawls toward said ratchet wheels.

8. The signal light apparatus according to claim 7 wherein said pawls have a curved ratchet wheel engagement surface and a flat ratchet wheel engagement surface, the ratchet wheel engagement surfaces of said first and second pawls being oriented in opposition to one another.

9. The signal light apparatus according to claim 8 wherein said springs are spring steel supports for said pawls.

10. The signal light apparatus according to claim 6 wherein two pawls are in engagement with at least one of said ratchet wheels at spaced locations thereon.

11. The signal light apparatus according to claim 1 wherein said mast includes a straight central mast portion and spaced end portions laterally projecting from opposed ends of said central mast portion whereby said mast has a generally Z-shaped configuration.

12. The signal light apparatus according to claim 11 wherein said end portions extend along substantially parallel axes and are vertically disposed when said tiltable structure is not tilted relative to said base member.

13. The signal light apparatus according to claim 12 wherein said counter-weight structure is attached to one of said end portions and said at least one signal light is attached to the other of said end portions.

14. The signal light apparatus according to claim 13 wherein said end portion having the counter-weight structure attached thereto is adjacent and substantially parallel to said base member when said tiltable structure is not tilted.

15. The signal light apparatus according to claim 14 additionally including lock structure for locking the end portion having the counter-weight attached thereto to said base member to prevent tilting of said tiltable structure.

16. The signal light apparatus according to claim 14 wherein said counter-weight structure comprises a metal framework projecting away from said base member when said tiltable structure is not tilted.

17. The signal light apparatus according to claim 1 additionally including a handle operatively associated with said tiltable structure to manually tilt said tiltable structure relative to said base member.

* * * * *